E. R. GODWARD.
COMBINATION HOE.
APPLICATION FILED APR. 8, 1913.
1,091,058.
Patented Mar. 24, 1914.
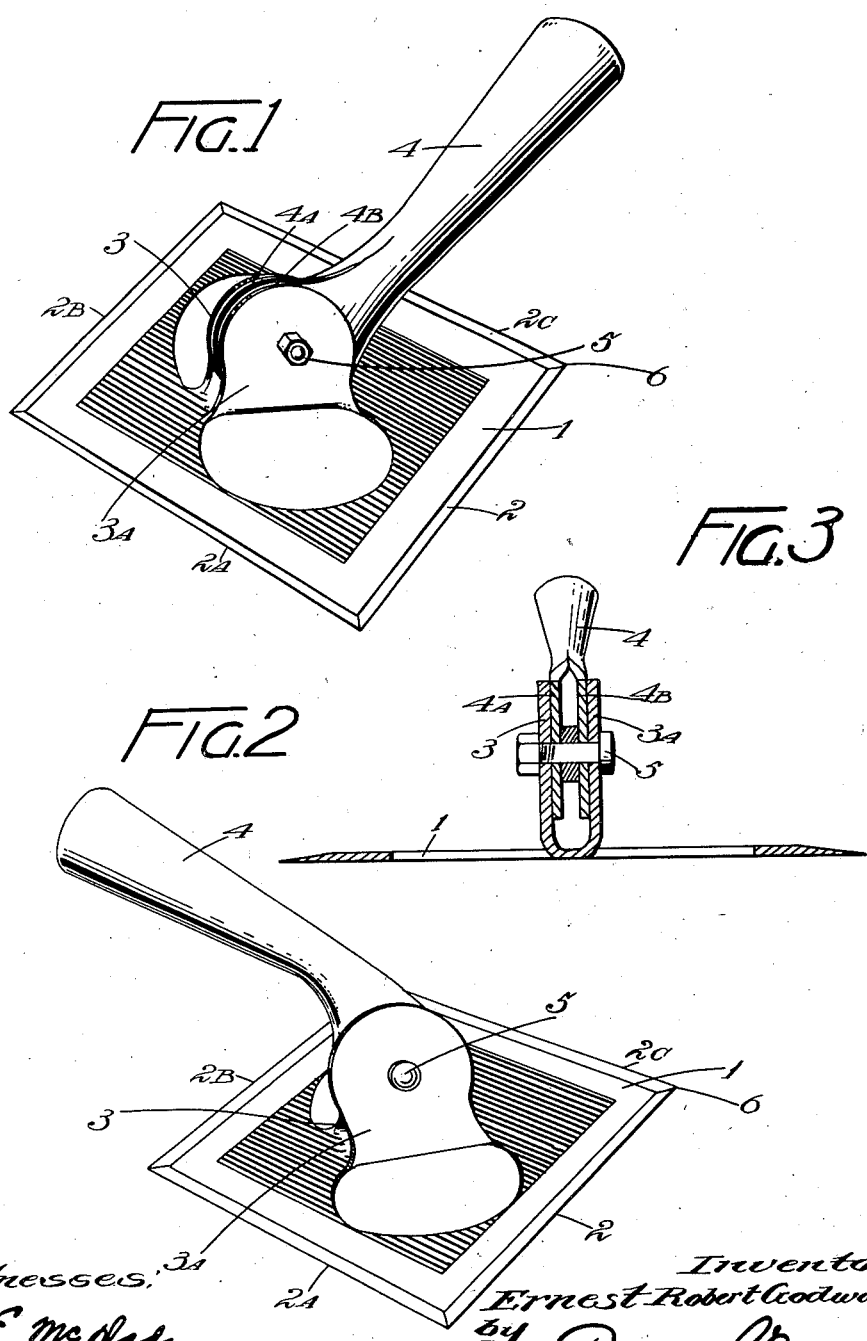
Witnesses:
M. E. McNade
Inventor
Ernest Robert Godward
by
James L. Norris,
Attorney.

UNITED STATES PATENT OFFICE.

ERNEST ROBERT GODWARD, OF DUNEDIN, NEW ZEALAND.

COMBINATION-HOE.

1,091,058.
Specification of Letters Patent.
Patented Mar. 24, 1914.

Application filed April 8, 1913. Serial No. 759,706.

*To all whom it may concern:*

Be it known that I, ERNEST ROBERT GODWARD, cycle mechanic, subject of King George V of Great Britain, residing at No. 40 Dowling street, Dunedin, in the Dominion of New Zealand, have invented new and useful Improvements in Combination-Hoes, of which the following is a specification.

This invention relates to a new and improved combination hoe having a blade of that class which is capable of being adjusted to different angles in order to combine in one implement a tool suitable for many purposes.

In the accompanying drawings: Figures 1 and 2 are perspective views of the improved hoe showing the handle thereof in two positions; and Fig. 3 is a transverse vertical sectional view of Fig. 2.

The hoe consists of a blade made of a flat, square metal plate 1 of suitable thickness having four cutting edges, 2, $2^A$, $2^B$ and $2^C$. Two opposed, arcuate cuts are made in the plate and the parts defined by these cuts are bent upwardly and inwardly toward each other to approximately a right angle to the surface of the plate, thereby forming brackets 3 and $3^A$ which constitute part of an adjustable friction handle joint. Holes are punched or bored in the brackets 3 and $3^A$ to register with the holes formed in a pair of lugs $4^A$ and $4^B$ provided on a handle socket 4, which latter is preferably formed from one piece of metal and is provided at its lower end with the afore-mentioned lugs. These lugs are spaced apart by a distance piece. The plate 1 is secured to the socket by means of a bolt 5 which is adapted to be adjusted in order to rigidly maintain the plate at any desired angle, the center of the bolt being in such a position that when the handle is arranged as shown in Fig. 2, the front point 6 of the plate is approximately in line with the longitudinal axis of the handle, and in this position the said point 6 acts as a guide, the edges receding from said point and being disposed at right angles to each other, thereby giving a shearing instead of a straight or pushing cut. When the handle is adjusted to the angle indicated in Fig. 1, the center of the plate is approximately in line with the longitudinal axis of the handle. The plate being adjustable, the hoe may be used for trimming grass borders, ridging drills, and as a push or pull hoe.

Having now described my invention, what I claim and desire to secure by Letters Patent is:—

A hoe of the class described comprising a flat metal plate provided with a plurality of cutting edges, and having cuts made therein partially severing parts thereof, the said parts being bent upward approximately at right angles to the surface of the plate forming a pair of spaced brackets providing part of an adjustable handle joint, and a tapered socket having lugs formed thereon which are fitted between and coupled to said brackets.

In testimony whereof I have signed my name to this specification in the presence of two subscribing witnesses.

ERNEST ROBERT GODWARD.

Witnesses:
ROBERT PARK, Jr.,
NELINA MACDONALD.